US006924565B2

United States Patent
Wilkins et al.

(10) Patent No.: US 6,924,565 B2
(45) Date of Patent: Aug. 2, 2005

(54) CONTINUOUS REACTIVE POWER SUPPORT FOR WIND TURBINE GENERATORS

(75) Inventors: Thomas A. Wilkins, Tehachapi, CA (US); Nagwa M. Elkachouty, Tehachapi, CA (US); Reigh A. Walling, Clifton Park, NY (US); James P. Lyons, Niskayuna, NY (US); Robert W. Delmerico, Clifton Park, NY (US); Sumit Bose, Niskayuna, NY (US); Nicholas Wright Miller, Delmar, NY (US)

(73) Assignee: General Electric Company, Schenectady, NY (US)

( * ) Notice: Subject to any disclaimer, the term of this patent is extended or adjusted under 35 U.S.C. 154(b) by 123 days.

(21) Appl. No.: 10/643,297

(22) Filed: Aug. 18, 2003

(65) Prior Publication Data

US 2005/0040655 A1 Feb. 24, 2005

(Under 37 CFR 1.47)

(51) Int. Cl.[7] ................................................ F02D 9/00
(52) U.S. Cl. .............................. 290/44; 290/55; 322/29
(58) Field of Search ........................... 290/1 A, 44, 55; 322/27, 28, 29

(56) References Cited

U.S. PATENT DOCUMENTS

| | | | | |
|---|---|---|---|---|
| 5,083,039 A | * | 1/1992 | Richardson et al. | 290/44 |
| 5,187,427 A | | 2/1993 | Erdman | |
| 5,225,712 A | | 7/1993 | Erdman | |
| 5,652,485 A | * | 7/1997 | Spiegel et al. | 318/147 |
| 5,798,631 A | * | 8/1998 | Spee et al. | 322/25 |
| 5,798,632 A | * | 8/1998 | Muljadi | 322/29 |
| 6,137,187 A | * | 10/2000 | Mikhail et al. | 290/44 |
| 6,566,764 B2 | * | 5/2003 | Rebsdorf et al. | 290/44 |
| 6,600,240 B2 | * | 7/2003 | Mikhail et al. | 307/85 |
| 6,809,431 B1 | * | 10/2004 | Schippmann | 290/55 |

OTHER PUBLICATIONS

Magni Palsson et al., "Large–scale Wind Power Integration and Voltage Stability Limits in Regional Networks," SINTEF Energy Research, pp. 1–8, <transmission.bpa.gov/orgs/opi/Power_Stability/PwrElectPanelSINTEF.pdf>.

Jose Luis Rodriquez–Amenedo et al., "Automatic Generation Control of a Wind Farm With Variable Speed Wind Turbines," IEEE Transactions on Energy Conversion, vol. 17, No. 2, Jun. 2002, pp. 279–284, USA.

J.R. Saenz et al., "Reactive Power Control of a Wind Farm Through Different Control Algorithms," IEEE, 2001, pp. 203–207, USA.

Dejan Schreiber, "State of the Art of Variable Speed Wind Turbines," 11th International Symposium on Power Electronics, Oct. 31–Nov. 2, 2001, pp. 1–4, Novi Sad, Yugoslavia.

A. Tapia, et al., "Reactive Power Control of a Wind Farm made up with Doubly Fed Induction Generators (II)," IEEE Porto Power Tech Conference, Sep. 10–13, 2001, pp. 1–5, Portugal.

Tom Wind, "Wind Turbines Offer New Voltage Control Feature," Power Engineering, Sep. 1999, pp. 1–2.

Enron Wind Webpage, pp. 1–2, <wind.enron.com>.

* cited by examiner

*Primary Examiner*—Nicholas Ponomarenko
(74) *Attorney, Agent, or Firm*—Blakely, Sokoloff, Taylor & Zafman LLP

(57) ABSTRACT

Real and reactive power control for wind turbine generator systems. The technique described herein provides the potential to utilize the total capacity of a wind turbine generator system (e.g., a wind farm) to provide dynamic VAR (reactive power support). The VAR support provided by individual wind turbine generators in a system can be dynamically varied to suit application parameters.

40 Claims, 10 Drawing Sheets

CONTINUOUS REACTIVE POWER SUPPORT FOR WIND TURBINE GENERATORS

TECHNICAL FIELD

The invention relates to generation and distribution of electric power. More particularly, the invention relates to compensation of electric power supplies for reactive loads.

BACKGROUND

Power transmission and distribution grids transmit electrical energy from generating facilities to end users. Voltage management on the transmission and distribution system is an important consideration for the operational and design of the system. In a typical system reactive power flow has a strong influence on voltage. Reactive power flow can be influenced by the generator source, changes in the transmission and distribution system, the addition of shunt reactive elements, and loads. Furthermore, excessive reactive power flow can raise voltage and put undue stress on transmission lines, transformers and other electrical components.

With reference to FIGS. 1, 2 and 3, electrical power has at least two characteristics relevant to power distribution: voltage and current. In a large-scale power distribution grid both voltage and current vary over time. When the instantaneous voltage is multiplied by the instantaneous current, the result is the instantaneous power. In most power distribution grids the voltage and current signals have the form of a sine wave.

If the reactive power (i.e., VAR) flow is zero, the voltage and current waves are in phase as illustrated in FIG. 1, where $v(\omega t)$ is the time-varying voltage wave form and $i(\omega t)$ is the time-varying current wave form. However, if the reactive power (i.e., inductive or capacitive) is non-zero, the voltage wave form, $v(\omega t)$, will not be in phase with the current wave form, $i(\omega t)$. The amount by which the current lags or leads the voltage can be quantified by a power factor angle, $\phi$, which is representative of the fraction of a cycle by which the current leads or lags the voltage. A cycle is $2\pi$ or $360°$, and the power factor angle, $\phi$, is the difference between the cycles of the current and voltage.

With respect to a constant voltage wave form, $v(\omega t)$, a lagging current is illustrated as $i(\omega t-\phi)$ in FIG. 2 and a leading current is illustrated as $i(\omega t+\phi)$ in FIG. 3. The amount by which the current lags or leads the voltage can be quantified by a power factor angle $\phi$, which is representative of the fraction of a cycle by which the current lags or leads the voltage. A cycle is $2\pi$ or $360°$, and the power factor angle, $\phi$, is the difference between the cycles of the current and the voltage.

Reactive power factor is important from the standpoint of power delivery. Since most transmission systems are inductive, increasing the reactive current component (i.e., capacitive VARs) will cause the voltage to rise. Conversely, decreasing the reactive power component (i.e., inductive VARs) will cause the voltage to decrease.

Wind farm reactive power flow control can be achieved by the individual wind turbine generator, shunt elements (e.g., switched capacitors or switched reactors), transformer tap changers, or some combination of these.

SUMMARY

A network of variable speed wind turbine generator systems includes a generators to generate real power and reactive power and a system controller coupled with the generators to control real and reactive power generated by individual generators based on thermal capability and/or voltage limits of the individual generators to cause the network of generator systems to provide commanded real and reactive power.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

The technique described herein provides the potential to utilize the total capacity of a wind turbine generator system (i.e., a wind farm) to provide dynamic VAR (reactive power support). The VAR support provided by individual wind turbine generators in a system can be dynamically varied to suit application parameters.

Figure 6:
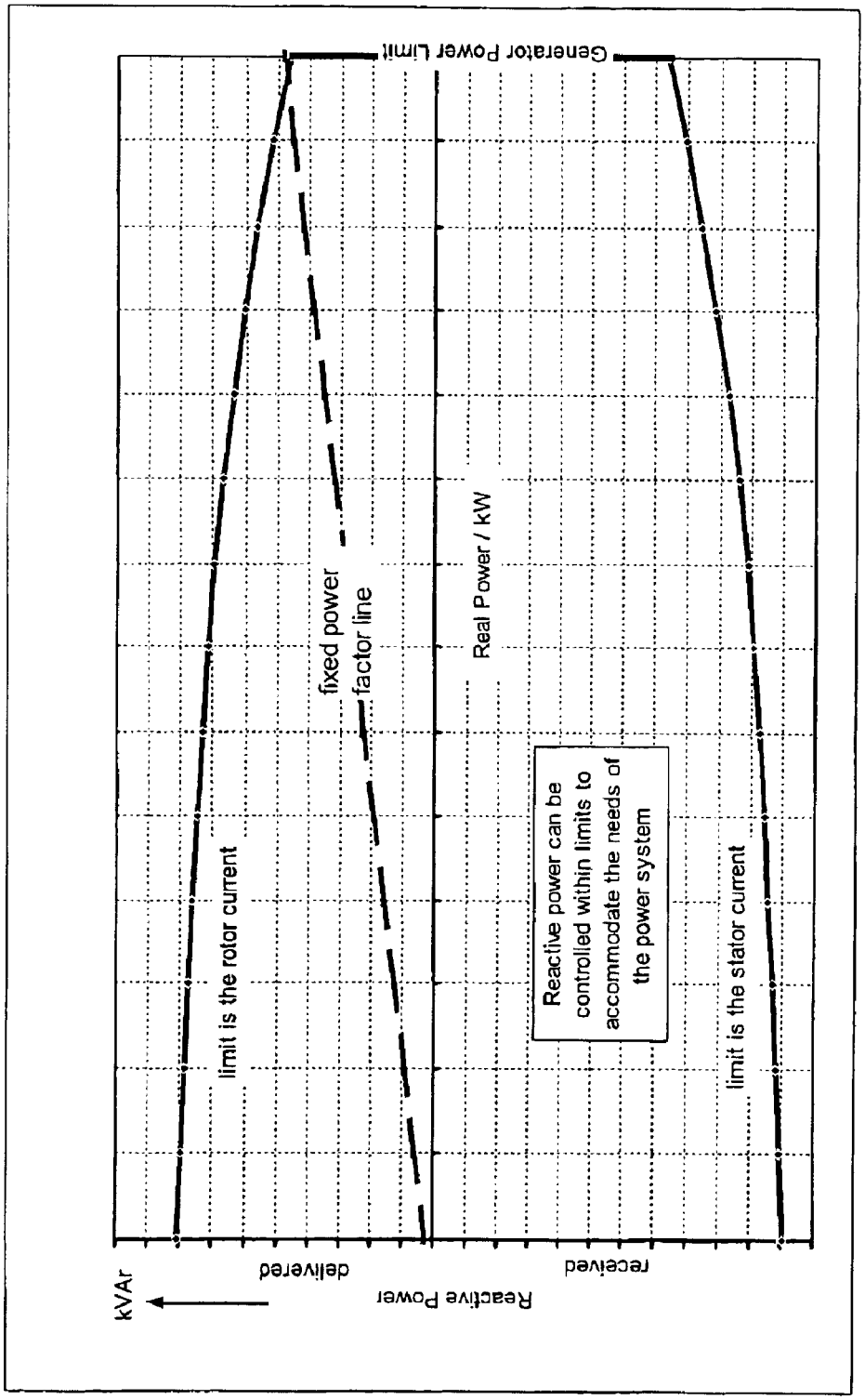
FIG. 6 is a conceptual illustration of real and reactive power capability curve for a wind turbine.

Wind turbine generators can provide VAR support based on real power generation and power factor. This type of VAR support can be described, for example, by the equation:

$$VAR = Watt * \tan(\theta)$$

where $\theta$ is the power factor angle. Power factor control has some shortcomings. Because VAR support is proportional to the square of power output this technique does not utilize the total capability of the respective wind turbine generators, as shown in FIG. 6. Also, power factor control may occasionally result in the wrong action being taken to inherently maintain a desired voltage at the point of common coupling (PCC).

In one embodiment, a voltage controller monitors the point of common coupling (PCC) between a wind turbine generator system (e.g., a wind farm) and a connection with a utility grid. The voltage controller measures the grid voltage and compares the grid voltage to a desired voltage. The voltage controller computes the amount of reactive power required from the windfarm system so that the grid voltage is within a desired range.

In one embodiment, to provide the desired power (including reactive power) at the PCC, a dynamic voltage controller transmits reactive power commands to individual wind turbine generators through a distributed control network. The wind turbine generators interprets the received commands and excites its generator to produce the commanded reactive power. As the reactive power changes, the measured gird voltage moves toward the desired voltage level. Thus, the system provides a closed-loop voltage control system.

A wind turbine generator consists of a rotating electrical machine mechanically coupled to the turbine blades. The mechanical energy of the turbine is converted to electrical energy delivered to the power grid through the collector system. An electronic power converter is used to control the flow of real and reactive power.

Figure 12:
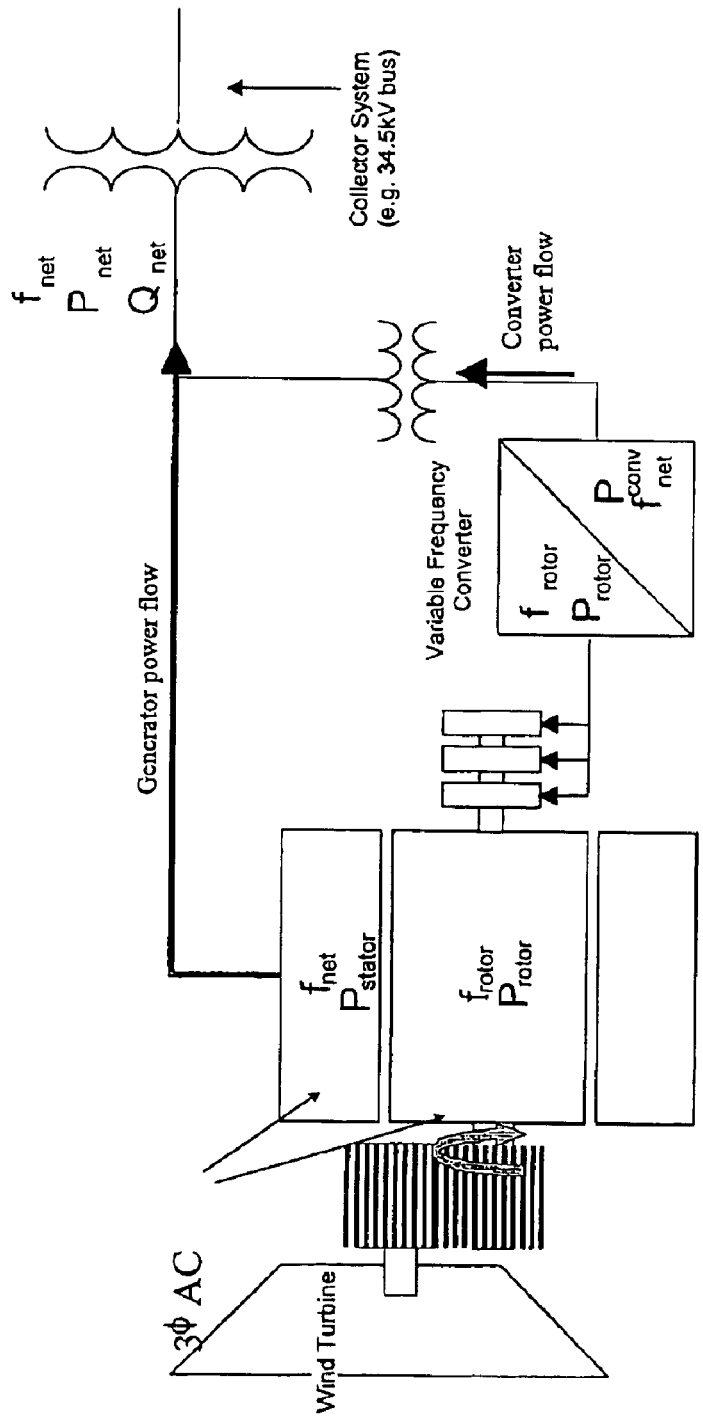
FIG. 12 is a block diagram of one embodiment of a doubly-fed induction generator system.

In one embodiment, shown in FIG. 12, the generator is a doubly fed induction-generator with a wound rotor and slip rings. A variable frequency power converter excitation system tied to the generator rotor allows the generator to operate (for example) at speeds ranging from 800 rpm to 1,600 rpm. The variable frequency power converter excitation system is also used to adjust the reactive power output of the generator.

For reactive power generation the response time of the frequency converter generator system is equivalent to a static VAR regulator. The power converter can also be controlled, independently of the generator, to contribute reactive power to the collector system as shown in FIG. 12.

Figure 1:
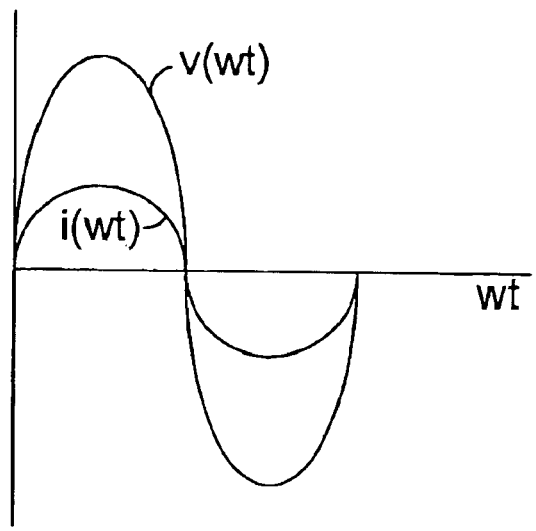
FIG. 1 illustrates a waveform of voltage and current in phase.
Figure 2:
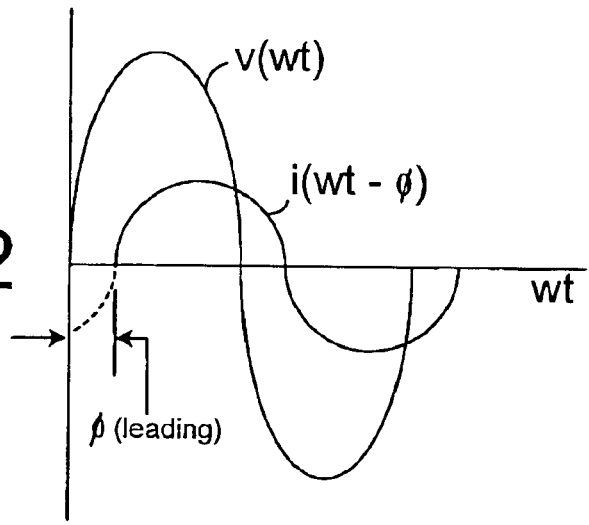
FIG. 2 illustrates a waveform of voltage leading current.
Figure 3:
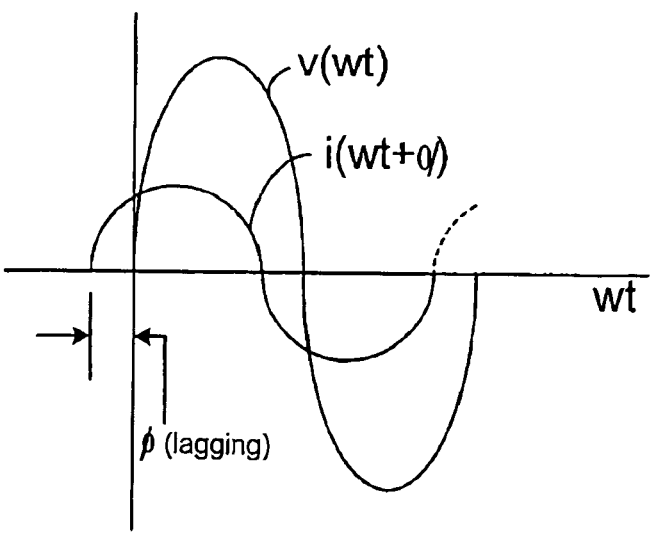
FIG. 3 illustrates a waveform of voltage lagging current.
Figure 4:
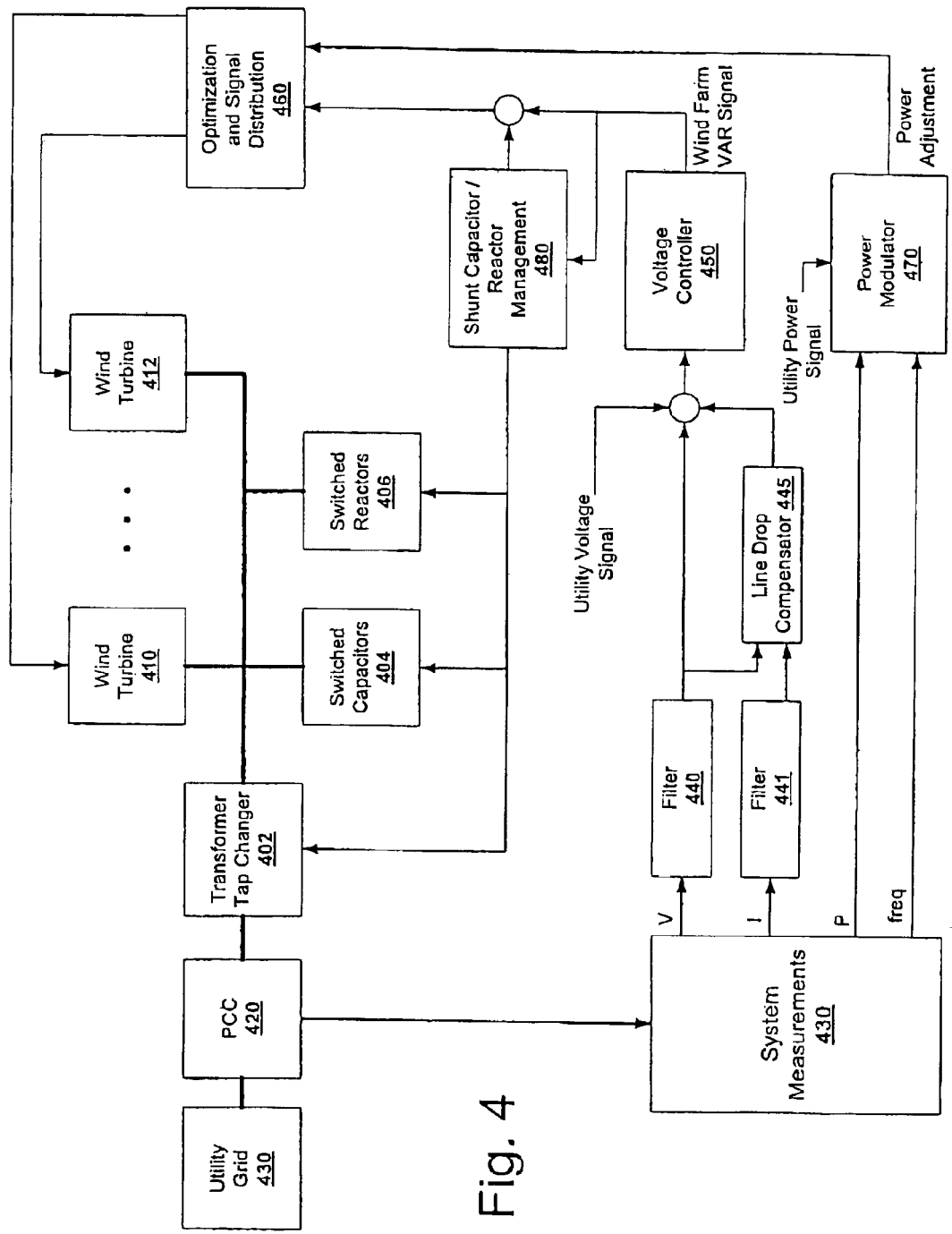
FIG. 4 is a block diagram of a closed-loop embodiment of a wind turbine system in which wind turbine generators can be individually controlled to provide reactive power support.

FIG. 4 is a block diagram of a closed-loop embodiment of a wind turbine system in which wind turbine generators can be individually controlled to provide reactive power support. Wind turbine system 400 is illustrated with two wind turbines (410 and 412), each including a generator. However, any number of wind turbines can be included in a system utilizing the techniques described herein.

The individual wind turbines are electrically coupled to point of common coupling (PCC) 420. Because many wind turbine systems include a large number of wind turbines distributed over a large area, the distance between each wind turbine and PCC 420 may vary.

System measurement 430 is coupled with PCC 420. One of the functions of system measurement 430 is to monitor voltage, current and power at PCC 420. System measurement 430 provides signals to filters 440 and 441, line drop compensator 445 and voltage controller 450 based on the voltage at PCC 420. Other factors can also be included in the signals provided to filter 440, line drop compensator 445 and voltage controller 450.

Figure 9:
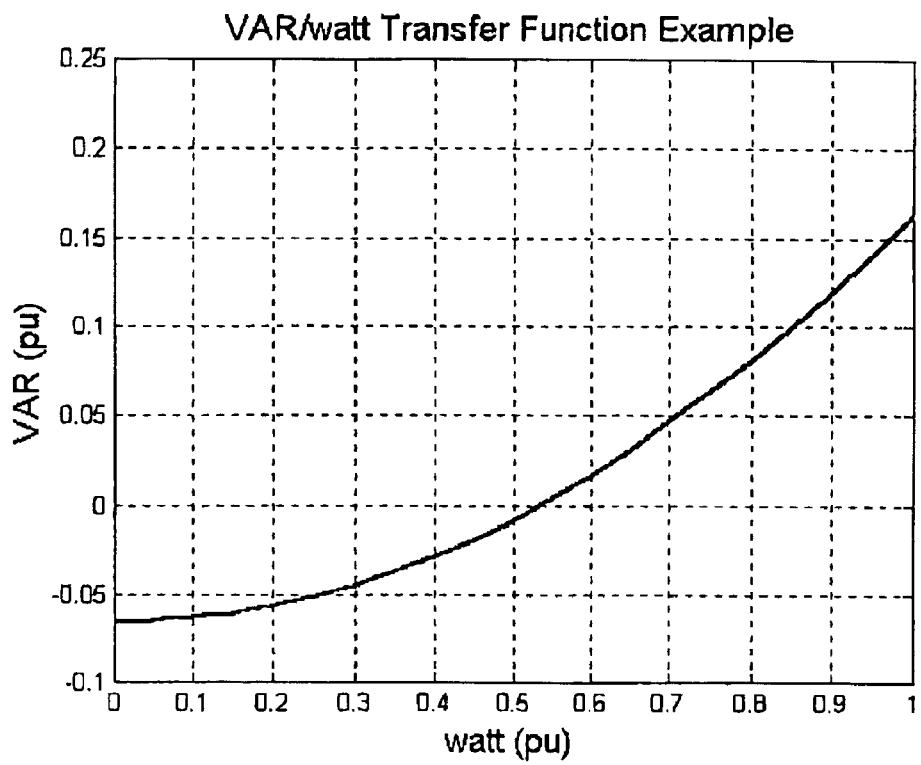
FIG. 9 is an example transfer function to provide a desired voltage profile at a fixed location in the power system.

Line drop compensator 445 is an optional component that can be used to compensate for voltage drops caused by transmission from PCC 420 to utility grid 430. In one embodiment, the compensation includes the effects of line charging. In one embodiment, the relationship between the voltage (Es) and current (Is) measurements at the PCC and the calculated voltage (Er) in the utility grid is: $E_r = A \cdot E_s + B \cdot I_s$ where A and B are complex coefficients derived transmission line parameters (e.g., line impedance and shunt reactance). FIG. 9 is an example transfer function to provide a desired voltage profile at a fixed location in the power system. In general, the shape of the transfer function can be different for each application and is determined based on detailed power system studies.

System measurement 430 provides a signal to filter 440 corresponding to the voltage measured at PCC 420; and a signal to filter 441 corresponding to the current measured at PCC 420. Filter 440 filters out harmonics and noise, and provides a filtered signal corresponding to the voltage at PCC 420 to voltage controller 450 and line drop compensator 445. Filter 441 filters out harmonics and noise, and provides a filtered signal corresponding to the current at PCC 420 to line drop compensator 445. Line drop compensator 445 is an optional component that can be used to compensate for voltage drops caused by transmission from PCC 420 to utility grid 430 or within system 400. In one embodiment, the output signals from filter 440 and line drop compensator 445 are combined to provide an input signal to voltage controller 450.

In one embodiment, PI controller 450 determines the desired reactive power to be provided to PCC 420. The reactive power to be provided can be in terms of system 400 as a whole, individual wind turbines or groups of turbines.

The optimization controller 460 is an optional component that receives a power adjustment signal from power modulator 470, a wind farm VAR signal from voltage controller 450, and a VAR adjustment signal from shunt capacitor/reactor management 480. The optimization controller 460 calculates an individual reactive power command for each wind turbine that minimizes wind farm system losses or optimizes the collector system voltage distribution. One embodiment of an optimization controller is described in greater detail below with respect to FIG. 8.

Figure 10:
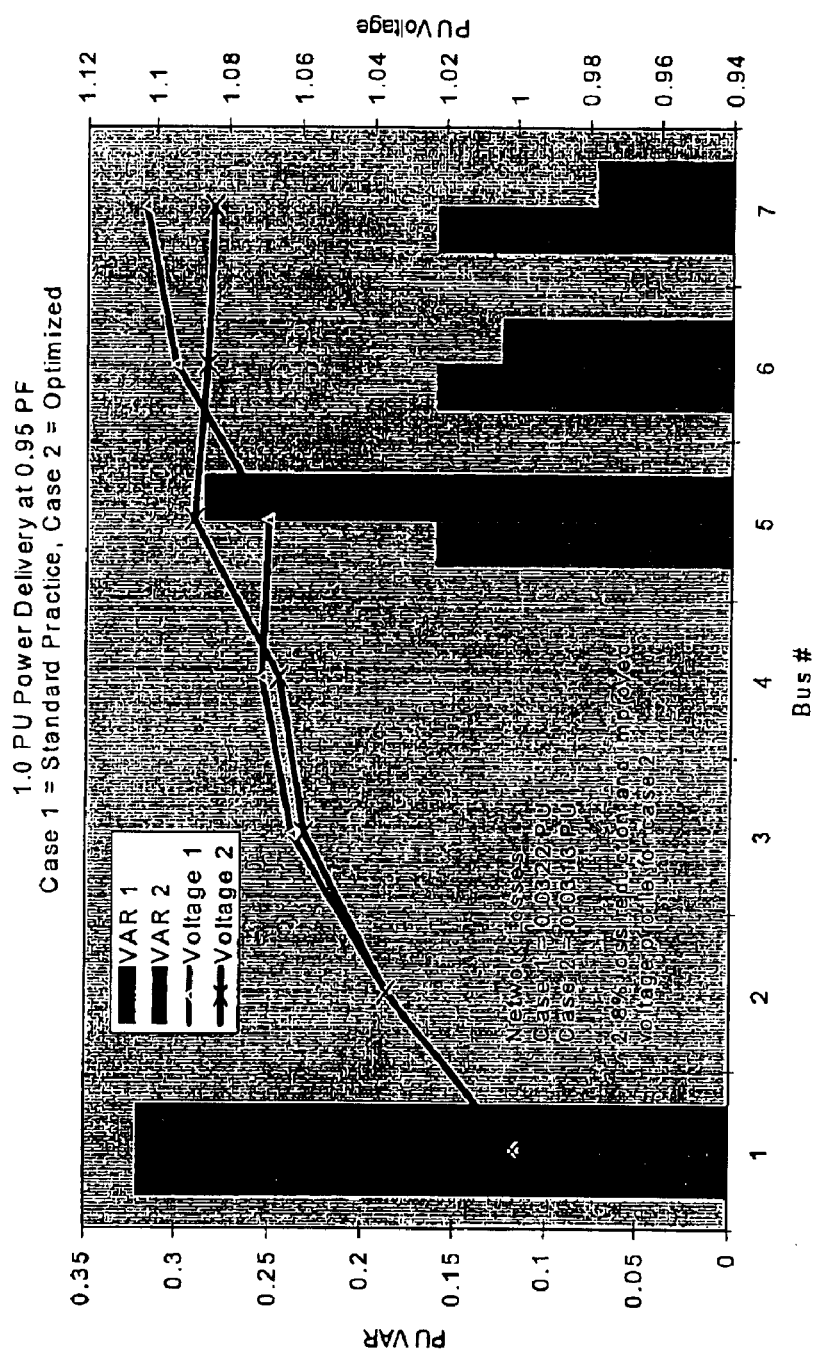
FIG. 10 is an example optimization comparison for a simple network.
Figure 11:
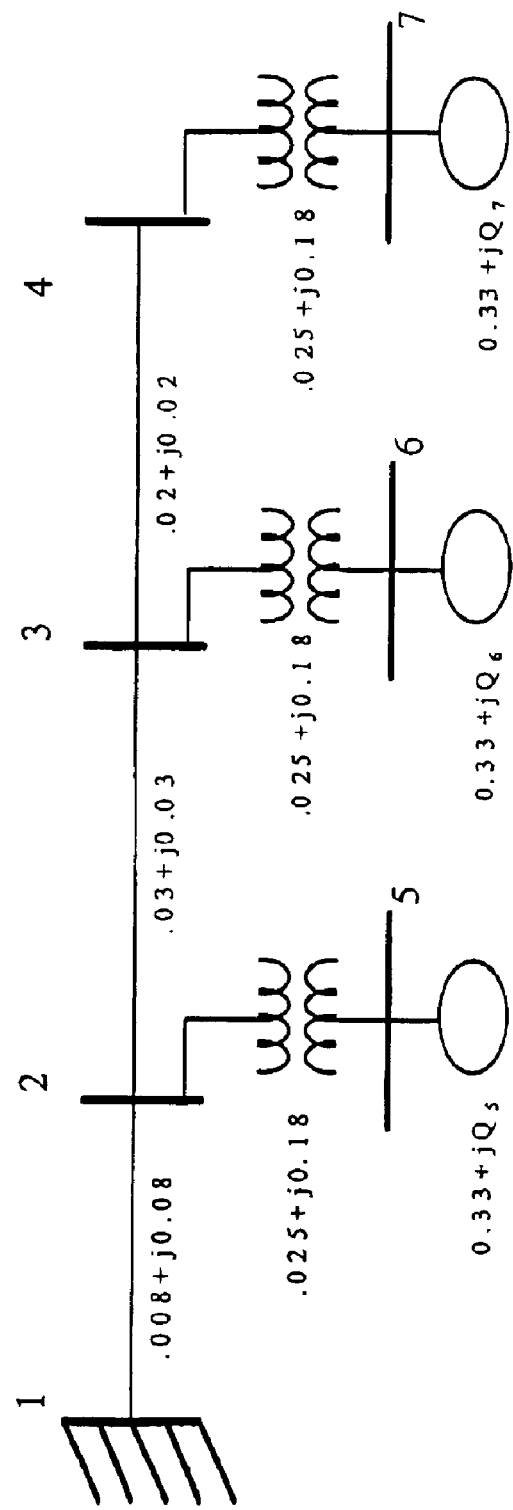
FIG. 11 is the simple network corresponding to the optimization comparison of FIG. 10.

Mathematically an optimization problem is generally described by minimizing an objective function J(u,x) subject to some constraint conditions. In matrix notation:
Minimize J(u,x)
subj. to: d(u,x)=0 e(u,x)≦0
x: system variables (e.g., bus voltages, power factor)
u: control variables (e.g., generator reactive power)
J(u,x): objective function
d(u,x): equality constraints
e(u,x): inequality constraints
A sample objective function is shown in Equation (1). This function is intended to minimize distribution line losses (PL) subject to maintaining power factor at the windfarm PCC. It may also be desirable to establish a hierarchy of performance, enforcing a tighter voltage tolerance band at a subset of nodes.

$$\text{Minimize } J = \sum_{k=1}^{n} PL_k \qquad \text{Equation (1)}$$

subj. to: system PF=0.95 (over excited)
For illustration, a simple optimization comparison is shown in FIG. 10 for the simple network of FIG. 11.

Some wind farm applications may require the addition of switched capacitors 404 and switched reactors 406 within the wind farm. Shunt capacitor/reactor management 480 is an optional component that coordinates and optimizes the operation of these switched elements with the reactive power out put of the wind turbines 410 and 412. An optional transform tap changer 402 may also be coordinated with the switched reactors 406, capacitors 404 and wind turbine VAR signals.

The wind turbines of system 400 receive the power commands from voltage controller 450 and optional optimization controller 460, and individually react to the commands. Power adjustment and VAR commands can be distributed to the wind turbines via a shared data bus with each wind turbine having an address or other identifier. Alternatively, power adjustment and VAR commands can be distributed to the wind turbines via individual connections, for example, through a hub device.

When the wind turbines react to the commands, the control system of the individual wind turbines cause the necessary changes (e.g., blade pitch changes, generator torque changes) to provide the real and reactive power indicated by the power commands. As a result of the control of the individual wind turbines, the real and reactive power at PCC 420 can be dynamically adjusted to provide the desired characteristics, which increases the performance and ancillary benefits of wind turbine system 400. Benefits include, but are not limited to; flicker reduction, voltage management, power curtailment, and power system stabilization.

Figure 5:
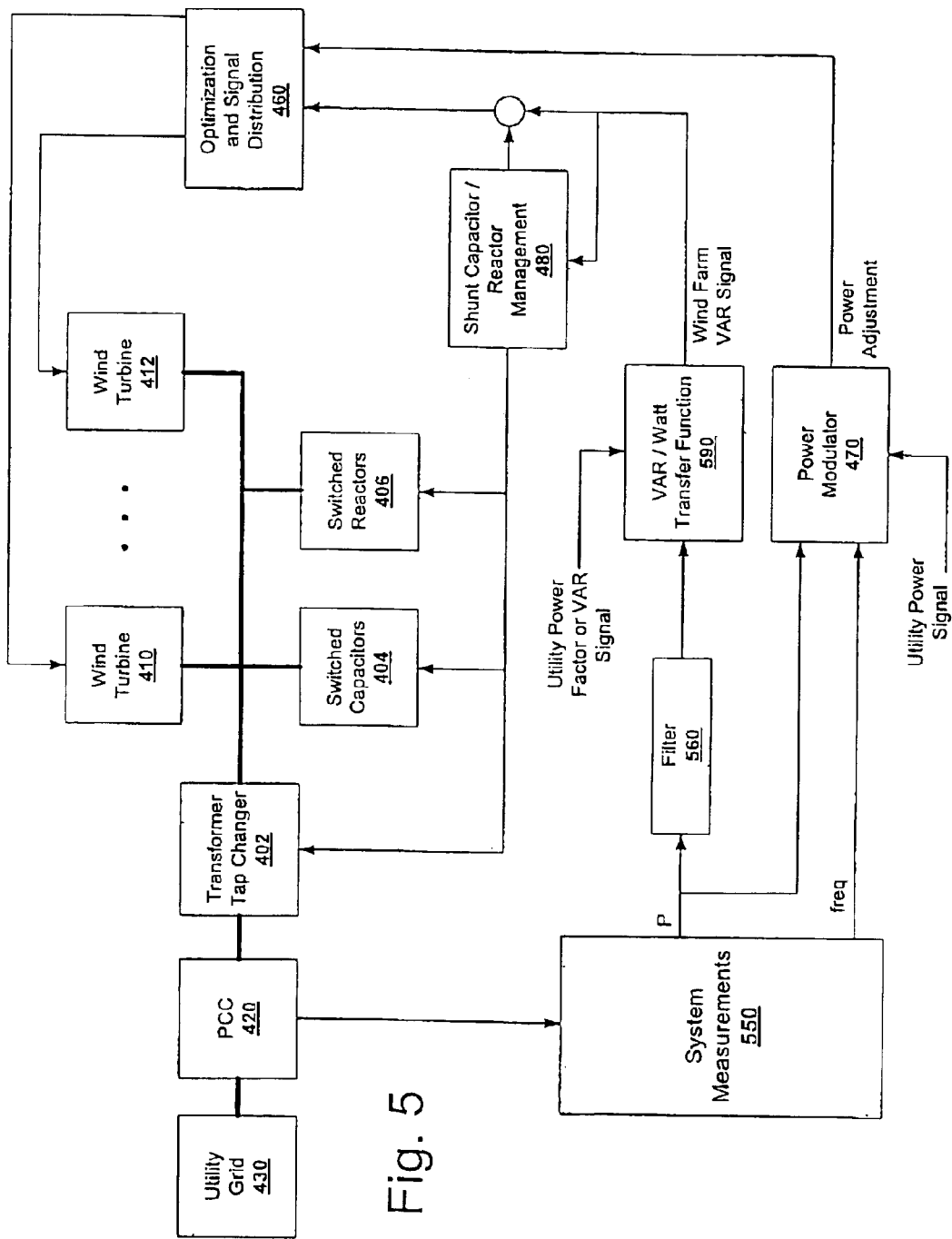
FIG. 5 is a block diagram of an open-loop embodiment of a wind turbine system in which wind turbine generators can be individually controlled to provide reactive power support.

FIG. 5 is a block diagram of an open-loop embodiment of a wind turbine system in which wind turbine generators can be individually controlled to provide reactive power support. Wind turbine system 500 includes wind turbines (410 and 412) and PCC 420 coupled with utility grid 430 as described above. As with system 400 of FIG. 4, any number of wind turbines can be included.

System measurement 550 monitors the power provided to PCC 420 by the wind turbines. System measurement 550 provides a signal to filter 560 corresponding to the power measured at PCC 420. Filter 560 filters out fast power fluctuations, and provides a filtered signal corresponding to the power at PCC 420 to VAR/Watt transfer function 590. In one embodiment, VAR/Watt transfer function 590 is a constant power factor characteristic. The VAR/Watt transfer function approximates a desired voltage profile at a point in the power system. One example of a VAR/Watt transfer function is illustrated in FIG. 9.

VAR/Watt transfer function 590 compares the power signal (P) from filter 560 to the VAR/Watt curve to dynamically determine the reactive power to be provided by system 500.

In one embodiment two signals ($Q_0$ and dQ/dP) are transmitted by the VAR/Watt transfer function 590 to the wind turbines (410 and 412) for local control. The wind turbines (410 and 412) local control is of the form $$Q_0+(dQ/dP)P,$$

where $Q_0$ is a common reactive power term that is provided to all wind turbine generators in a system and $$(dQ/dP)$$

is a slope term that can be used for fast dynamic control by the wind turbine's (410 and 412) local control.

FIG. 6 is a conceptual illustration of the real and reactive power capability of a wind turbine generator. The reactive power can be dynamically adjusted within the limits shown in FIG. 6.

The system configurations of FIGS. 4 and 5 provide several important features. The capability of each wind turbine generator in a system to operate as a static VAR compensator can be utilized within the capability curve shown in FIG. 6. In one embodiment, the reactive power compensation capacity of a wind turbine power converter can be used when the turbines are not running. In one embodiment, power system damping (e.g., angle of power swing, frequency and rate of change of angle of power swing) can be controlled by modulating the real and reactive power generation at the individual generator level or at the system level.

Figure 7:
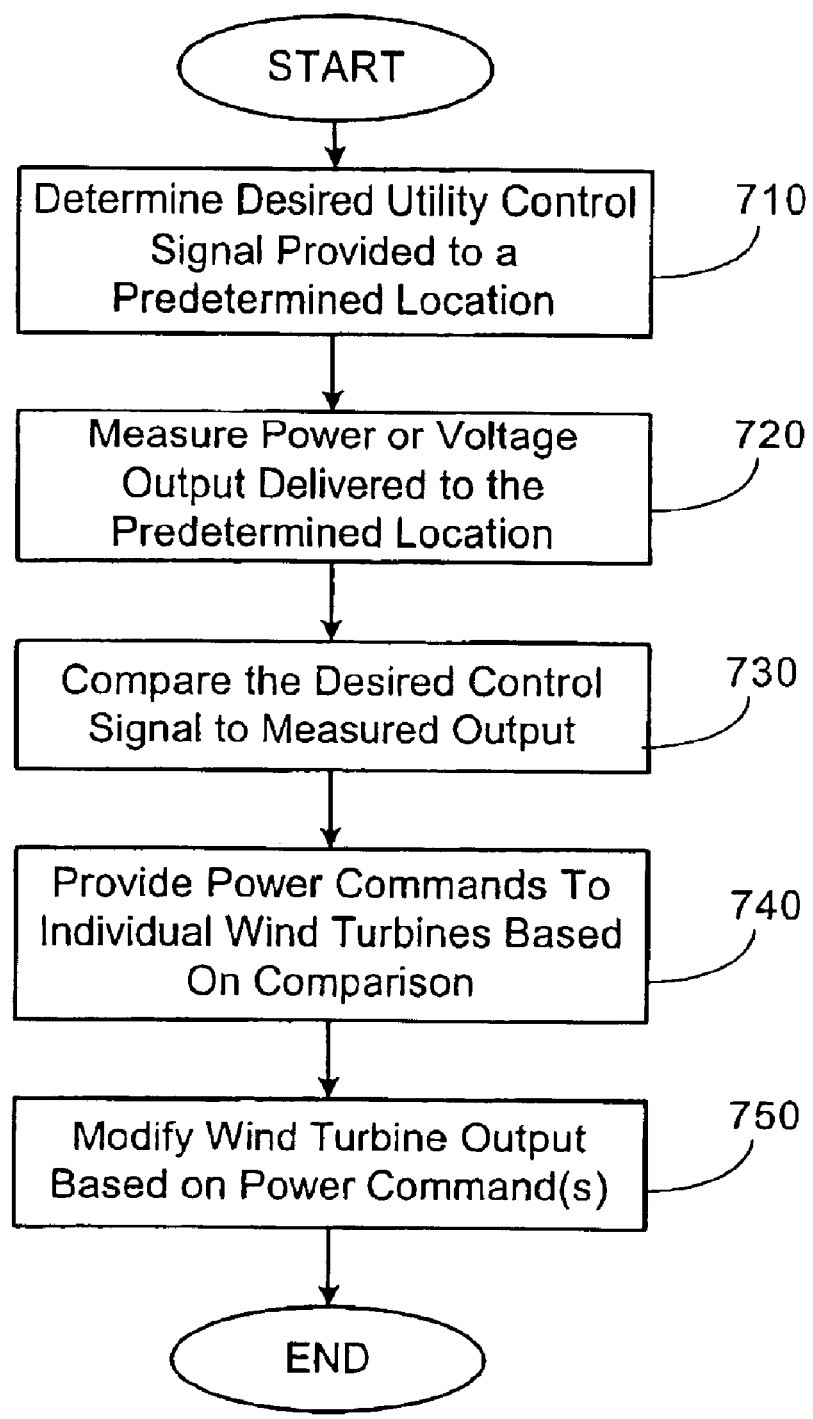
FIG. 7 is a flow diagram of one embodiment for dynamic reactive power control of individual wind turbines within a wind turbine system.

FIG. 7 is a flow diagram of one embodiment for dynamic power control of individual wind turbines within a wind turbine system. The desired utility control signal (e.g., voltage, power factor, or VARs) to be provided to a predetermined location is determined, 710. The predetermined location is typically the point of common coupling (PCC); however, if, for example, the wind turbine system is remotely located, the predetermined location can be a projected point based on a line-drop compensation algorithm.

The wind farm power or voltage output delivered to the predetermined location is measured, 720. The measured output is compared with the desired control signal, 730. In response to the comparison, the control system for the wind farm determines the magnitude of any corrections that may be required to provide the desired power to the predetermined location.

The control system determines the real and reactive power to be provided by each wind turbine generator in order to provide the desired control to the predetermined location. In one embodiment, each wind turbine generator can receive a command to provide a different combination of real and reactive power. The physical configuration of the wind farm including, for example, the types of generators, the placement of the wind turbines, the collector system design, and the distances between the wind turbines and the PCC can be used to determine the power commands to be provided to the individual wind turbine generators in order to improve system performance for reduced losses and voltage profile.

The power commands are transmitted to the individual wind turbine generators, 740. The power commands can be transmitted using any medium, whether wired or wireless, known in the art. Also, any protocol known in the art capable of transmitting commands to individual destinations within a group of potential destinations can be used. The individual wind turbine generators modify their respective outputs, if necessary, in response to the power commands, 750.

Figure 8:
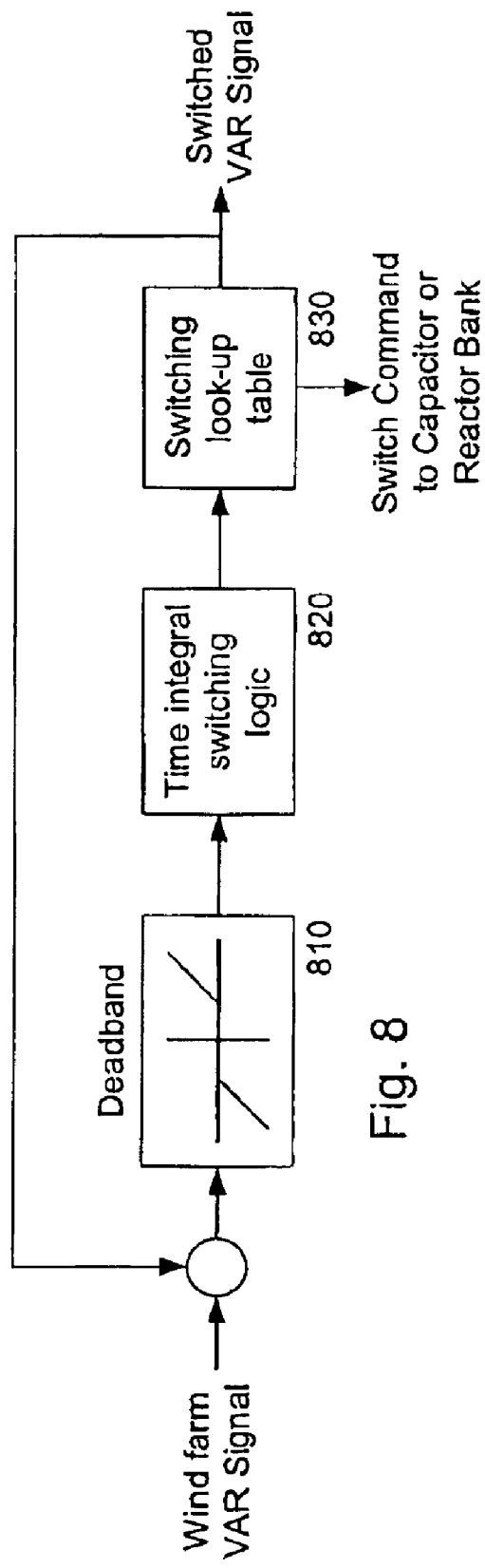
FIG. 8 is a block diagram of one embodiment of an optimization controller.

FIG. 8 is a block diagram of one embodiment of an optimization controller. Block 810 implements a deadband characteristic on the error between the Wind farm VAR signal and the VARs generated by the switched capacitors and reactors. The time integral of block 820 is used to establish an inverse time characteristic that initiates switching of the capacitor and reactor banks. Block 830 is used to determine which capacitor or reactor bank to switch.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A network of variable speed wind turbine generator systems comprising:
   a plurality of generators to generate real power and reactive power, wherein one or more of the generators includes a variable frequency converter excitation system to control real power and reactive power flow, and further wherein the variable frequency converter excitation systems are capable of contributing reactive power independently of the generators; and a system controller coupled with the plurality of generators to control real and reactive power generated by individual generators in the plurality of generators based on thermal capability and/or voltage limits of the individual generators to cause the plurality of generators to provide commanded real and reactive power.

2. The network of variable speed wind turbine generator systems of claim 1 wherein the system controller further regulates voltage at a point of common coupling.

3. The network of variable speed wind turbine generator systems of claim 2 further comprising a line drop compensator coupled with the system controller to regulate voltage at a location other than a point of common coupling using voltage, current and/or power measurements at the point of common coupling.

4. The network of variable speed wind turbine generator systems of claim 1 further comprising switched power management components coupled with the plurality of generators and the system controller, wherein the switched power management components are controlled by the system controller.

5. The network of variable speed wind turbine generator systems of claim 4 wherein the switched power management components comprise switched capacitors and/or switched reactors.

6. The network of variable speed wind turbine generator systems of claim 1 wherein the individual generators operate as static VAR regulators under any wind condition.

7. The network of variable speed wind turbine generator systems of claim 1 wherein real and reactive power commands are received by the system controller from a utility grid operator.

8. The network of variable speed wind turbine generator systems of claim 7 wherein the system controller operates as a closed-loop controller that regulates real and reactive power at a point of common coupling.

9. The network of variable speed wind turbine generator systems of claim 7 wherein the system controller operates as a closed-loop controller and the network further comprises a line drop compensator coupled with the system controller to regulate real and reactive power at a location other than a point of common coupling using voltage, current and/or power measurements at the point of common coupling.

10. The network of variable speed wind turbine generator systems of claim 7 wherein the controller provides a unique reactive power command to each wind turbine generator in a wind farm.

11. The network of variable speed wind turbine generator systems of claim 4 wherein the reactive power command is coordinated with adjustments to the switched power management components.

12. The network of variable speed wind turbine generator systems of claim 11 wherein the reactive power command and the switched power management components are operated to optimize one or more of: increased dynamic range of reactive power production, reduced wind farm losses, improved wind farm voltage profile, and improved power production.

13. The network of variable speed wind turbine generator systems of claim 8 wherein the system controller causes each of the individual generators in the plurality of generators to generate substantially the same reactive power.

14. The network of variable speed wind turbine generator systems of claim 4 wherein commands to the individual wind turbine generators include a reactive power component in the form:

$$Q_0 + (dQ/dP)P,$$

where $Q_0$ is a nominal VAR operating point that is provided to all wind turbine generators in a system and $$(dQ/dP)P$$

is a reactive power/real power incremental slope multiplied by wind turbine generator power (P).

15. The network of variable speed wind turbine generator systems of claim 13 wherein the commands to the individual wind turbine generators further comprise a real power modulation signal to emulate a governor droop function.

16. The network of variable speed wind turbine generator systems of claim 13 wherein the commands to the individual wind turbine generators further comprise a real power modulation signal to provide power system damping based on measured and/or calculated frequency.

17. The network of variable speed wind turbine generator systems of claim 13 wherein the commands to the individual wind turbine generators further comprise a real and/or reactive power modulation signal to adjust network power based on a utility reference command.

18. The network of variable speed wind turbine generator systems of claim 17 wherein the system controller operates as an open-loop controller that regulates real and reactive power at a point of common coupling.

19. The network of variable speed wind turbine generator systems of claim 7 wherein the system controller operates as an open-loop controller and the network further comprises a line drop compensator coupled with the system controller to regulate real and reactive power at a location other than a point of common coupling using voltage, current and/or power measurements at the point of common coupling.

20. A method comprising:
    determining power to be provided to a predetermined location;
    providing commands to individual wind turbine generators in a multi-turbine system, wherein one or more of the generators includes a variable frequency converter excitation system to control real power and reactive power flow, and further wherein the variable frequency converter excitation systems are capable of contributing reactive power independently of the generators, the commands to control real and reactive power generated by individual generators in the plurality of generators based on thermal capability and/or voltage limits of the individual generators to cause the plurality of generators to provide commanded real and reactive power; and
    providing power from the wind turbine generators in response to the commands.

21. The method of claim 20 further comprising providing commands to regulate voltage at a point of common coupling.

22. The method of claim 20 further comprising regulating voltage with a line drop compensator at a location other than a point of common coupling using voltage, current and/or power measurements at the point of common coupling.

23. The method of claim 20 wherein the commands to the individual wind turbine generators further comprise a real and/or reactive power modulation signal to adjust network power based on a utility reference command.

24. The method of claim 20 further comprising controlling switched power management components coupled with the plurality of generators and the system controller.

25. The method of claim 24 wherein the reactive power command and the switched power management components are operated to optimize one or more of: increased dynamic range of reactive power production, reduced wind farm losses, improved wind farm voltage profile, and improved power production.

26. The method of claim 24 wherein the switched power management components comprise switched capacitors and/or switched reactors.

27. The method of claim 20 wherein the individual generators operate as static VAR regulators under any wind condition.

28. The method of claim 20 further comprising receiving real and reactive power commands from a utility grid operator.

29. The method of claim 20 wherein the plurality of generators to generate substantially the same reactive power.

30. The method of claim 20 wherein commands to the individual wind turbine generators include a reactive power component in the form:

$$Q_0+(dQ/dP)P,$$

where $Q_0$ is a nominal VAR operating point that is provided to all wind turbine generators in a system and $$(dQ/dP)P$$

is a reactive power/real power incremental slope multiplied by wind turbine generator power (P).

31. The method of claim 29 further comprising sending a real power modulation signal to the wind turbine generators to emulate a governor droop function.

32. The method of claim 29 further comprising sending a real power modulation signal to the wind turbine generators to provide power system damping based on measured and/or calculated frequency.

33. The method of claim 29 further comprising sending a real and/or reactive power modulation signal to the wind turbine generators to adjust network power based on a utility reference command.

34. An apparatus comprising:
means for determining power to be provided to a predetermined location;
means for providing commands to individual wind turbine generators in a multi-turbine system, wherein one or more of the generators includes a variable frequency converter excitation system to control real power and reactive power flow, and further wherein the variable frequency converter excitation systems are capable of contributing reactive power independently of the generators, the commands to control real and reactive power generated by individual generators in the plurality of generators based on thermal capability and/or voltage limits of the individual generators to cause the plurality of generators to provide commanded real and reactive power; and
means for providing power from the wind turbine generators in response to the commands.

35. The apparatus of claim 34 further comprising means for providing commands to regulate voltage at a point of common coupling.

36. The apparatus of claim 34 further comprising means for controlling switched power management components coupled with the plurality of generators and the system controller.

37. The apparatus of claim 34 further comprising means for receiving real and reactive power commands from a utility grid operator.

38. The apparatus of claim 34 further comprising means for sending a real power modulation signal to the wind turbine generators to emulate a governor droop function.

39. The apparatus of claim 34 further comprising means for sending a real power modulation signal to the wind turbine generators to provide power system damping based on measured and/or calculated frequency.

40. The apparatus of claim 34 further comprising means for sending a power modulation signal to the wind turbine generators to adjust network power based on a utility reference command.

* * * * *